(12) United States Patent
Allmann et al.

(10) Patent No.: US 7,770,850 B2
(45) Date of Patent: Aug. 10, 2010

(54) HOLDING DEVICE FOR AT LEAST ONE PIPE

(75) Inventors: Guenter Allmann, Biebertal-Frankenbach (DE); Roland Roth, Heuchelheim (DE)

(73) Assignee: Veritas AG, Gelnhausen (DE)

( * ) Notice: Subject to any disclaimer, the term of this patent is extended or adjusted under 35 U.S.C. 154(b) by 66 days.

(21) Appl. No.: 11/785,725

(22) Filed: Apr. 19, 2007

(65) Prior Publication Data

US 2007/0246614 A1    Oct. 25, 2007

(30) Foreign Application Priority Data

Apr. 19, 2006   (DE)   .................. 20 2006 006 347 U

(51) Int. Cl.
*F16L 3/08* (2006.01)
*F16L 3/22* (2006.01)

(52) U.S. Cl. ........................................ 248/68.1; 248/65

(58) Field of Classification Search ............... 248/68.1, 248/49, 65, 74.4, 74.2, 55

See application file for complete search history.

(56) References Cited

U.S. PATENT DOCUMENTS

| | | | | |
|---|---|---|---|---|
| 2,355,742 A | * | 8/1944 | Morehouse | 248/68.1 |
| 3,606,218 A | * | 9/1971 | Enlund et al. | 248/74.2 |
| 4,840,333 A | | 6/1989 | Nakayama | |
| 4,997,148 A | * | 3/1991 | Sherman | 248/74.1 |
| 5,002,243 A | * | 3/1991 | Kraus et al. | 248/68.1 |
| 5,033,701 A | | 7/1991 | Kraus | |
| 5,184,794 A | * | 2/1993 | Saito | 248/68.1 |
| 5,257,768 A | * | 11/1993 | Juenemann et al. | 248/604 |
| 6,126,119 A | * | 10/2000 | Giangrasso | 248/58 |
| 6,154,927 A | | 12/2000 | Oi et al. | |
| 6,308,921 B1 | * | 10/2001 | Borzucki | 248/68.1 |
| 6,450,459 B2 | * | 9/2002 | Nakanishi | 248/68.1 |
| 7,201,351 B2 | * | 4/2007 | Stigler | 248/74.1 |
| 7,201,352 B2 | | 4/2007 | Kawai | |
| 7,267,307 B2 | * | 9/2007 | Bauer | 248/65 |
| 2005/0253033 A1 | | 11/2005 | Mizukoshi et al. | |
| 2005/0284989 A1 | | 12/2005 | Mizukoshi | |

FOREIGN PATENT DOCUMENTS

DE    39 02 499 A1    8/1990

(Continued)

OTHER PUBLICATIONS

German Search Report dated Jul. 26, 2006 (with English translation of category of cited documents).

*Primary Examiner*—Anita M King
(74) *Attorney, Agent, or Firm*—Buchanan Ingersoll & Rooney PC

(57) ABSTRACT

A holding device for at least one pipe, or the like, is disclosed, the holding device including a housing having a basic body and a lid movable relative to the basic body, and an insert for insertion into the housing. The insert includes at least one substantially U-shaped pipe receiving area into which the pipe is insertable through an insertion slot in a radial direction, so that the insert surrounds the pipe at least in sections. To improve the holding device such that it achieves improved acoustic decoupling together with a considerably simplified structure, it is provided that the insert includes a flexible device configured to close the insertion slot in the closed state of the lid at least in sections.

11 Claims, 1 Drawing Sheet

FOREIGN PATENT DOCUMENTS

| | | |
|---|---|---|
| DE | 198 10 834 A1 | 9/1998 |
| EP | 0 379 860 (B1) | 8/1990 |
| EP | 1 596 111 A1 | 11/2005 |
| FR | 2 551 174 (A1) | 3/1985 |
| JP | 2006-009992 A | 1/2006 |
| WO | 99/28663 A1 | 6/1999 |

\* cited by examiner

HOLDING DEVICE FOR AT LEAST ONE PIPE

The present invention relates to a holding device for at least one pipe, or the like, the holding device comprising: a housing having a basic body and a lid movable relative to the basic body, an insert for insertion into the housing, said insert comprising at least one substantially U-shaped pipe receiving means into which the pipe can be inserted through an insertion slot in radial direction, so that the insert surrounds the pipe at least in sections.

A generic holding device is e.g. known from DE 198 10 834 A1.

Such holding devices are used for absorbing pulses produced during the transfer of liquids or gaseous media through pipes as a consequence of pressure impacts. This is meant to prevent a situation where the pulses are transmitted to a support structure on which the pipes are to be mounted. The pulse absorption by the holding device is called acoustic decoupling.

With the conventional holding device it is possible to secure a pipe substantially captively to the support structure by closing the lid.

The conventional holding device, however, has a complex multi-part structure and can only receive one pipe at a time with a specific cross section in a pipe receiving means. If, however, in comparison with the cross-section of the pipe receiving means provided for, the pipe has a cross section even only insignificantly smaller, the pipe shows a play and cannot be safely fixed in the pipe receiving means. As a consequence, the acoustic decoupling is inadequate.

It is the object of the present invention to improve the conventional holding device such that it achieves improved acoustic decoupling together with a considerably simplified structure.

To achieve this object, the invention provides a holding device for at least one pipe, or the like, the holding device comprising: a housing having a basic body and a lid movable relative to the basic body, an insert for insertion into the housing, said insert comprising at least one substantially U-shaped pipe receiving means into which the pipe can be inserted through an insertion slot in radial direction, so that the insert surrounds the pipe at least in sections, wherein the insert comprises a flexible means configured to close the insertion slot in the closed state of the lid at least in sections. With the flexible means the pipe is additionally fixed in the closed state of the lid. The flexible means is part of the insert; a separate component for fixing the pipe is thus no longer needed. The flexible means is resilient and adjusts to the contour of the pipe even in the case of different diameters. On the whole, a better acoustic decoupling of the pipe from the support structure is accomplished together with a considerably simplified structure of the holding device.

In a preferred embodiment of the invention, the insert comprises at least one flexible holding projection extending into the pipe receiving means. This has the advantage that pipes of different cross-sections can be received in the pipe receiving means and can each be fixed secured in position. In the case of a pipe having a large cross-section the flexible holding projection will yield and increase the pressure on the pipe, which is thereby fixed in an even better way.

In a preferred embodiment of the invention the holding projection is rib-shaped. The pressure is here distributed linearly over the pipe.

In a preferred embodiment of the invention, the insert comprises a flexible abutment projection projecting at an abutment side of the holding device out of the housing. This accomplishes a particularly good acoustic decoupling of the pipe relative to a support device because only the insert that preferably consists of soft or resilient material and shows an absorbing action is arranged between the pipe and the support device.

In a preferred embodiment of the invention the abutment projection penetrates the abutment projection of the housing. The housing is preferably made from a resistant or rigid material to safely keep the pipe in position. The acoustic decoupling of the pipe from the support structure is however decisively influenced by the properties of the material of the insert. When the insert penetrates the housing, it can easily be brought into contact with the support structure so that together with an optimum fixation of the pipe by the housing an optimum acoustic decoupling of the pipe from the support structure can be accomplished by the insert at the same time.

In a preferred embodiment of the invention, the abutment projection is rib-shaped. The contact pressure is here linearly distributed between the abutment projection and the support device, and the holding device is supported in a stable manner.

In a preferred embodiment of the invention, the basic body and the lid are hingedly connected to each other via a hinge and are pivotable relative to each other. As a consequence, the lid cannot get lost during transportation.

In a preferred embodiment of the invention, the housing comprises a locking section with a projection engageable with a locking section with an eyelet so as to lock the housing in the closed state of the lid. The pipe is thereby safely fixed in the housing.

In a preferred embodiment of the invention, the basic body, the lid and the insert each comprise a through hole for receiving a bolt, the centers of the through holes in the closed state of the lid being substantially located along an axis. For instance, the holding device can selectively be mounted in the closed and/or opened state of the lid on a support device. Alternatively, a bolt may already be molded on the housing of the holding device, the bolt being insertable into a predetermined opening of the support device.

The holding projection and/or the abutment projection and/or the flexible means is/are preferably made integral with the insert, which permits a particularly simple manufacture in the injection molding process.

Preferred embodiments of the invention are claimed in the subclaims.

DETAILED DESCRIPTION OF THE PREFERRED EMBODIMENTS

The preferred embodiments of the invention shall be described hereinafter with reference to the attached drawings.

In the description of the invention, position-indicating terms such as "top" "bottom", left" "right", etc. will be used. These serve a better understanding of the description and only refer to the respective illustration in the figure. Moreover, such terms have no binding character.

Figure 1:
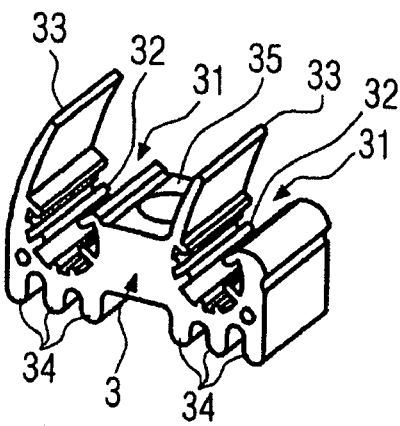
FIG. 1 is a perspective view of the insert of the holding device according to the invention.

FIG. 1 shows the insert 3 of the holding device 1 of the invention in a perspective view. The insert 3 comprises two pipe receiving means 31 of a substantially U-shaped configuration and a fastening section 35 centrally arranged between the pipe receiving means 31 and comprising a central through hole. Preferably, one to six pipe receiving means 31 are provided, the pipe receiving means 31 in the case of an even number being preferably arranged in symmetry with the fastening section 35. The width of the insert 3 or the axial length of each pipe receiving means 31 is preferably 1.5 to 2 times the diameter of a pipe 4 to be received in the pipe receiving means 31.

Each pipe receiving means 31 is substantially U-shaped and comprises an essentially semicircular holding section and an insertion slot through which the holding section is accessible and via which a pipe 4 is introduced in radial direction into the holding section. Elastic and flexible holding ribs 32 protrude substantially radially from the inner wall into the pipe receiving means 31. The holding ribs 32 are made integral with the insert 3 and are fabricated from the same material. They form the flexible holding projections within the meaning of the invention. The holding ribs 32 extend in an axial direction of a pipe received in the pipe receiving means 31 as intended (see FIG. 4) and are substantially equally spaced apart from one another. The holding ribs 32 extend substantially in parallel with one another and may project into the pipe receiving means 31 to different extents.

A flexible means 33 which is made integral with the insert 3 is provided on each receiving means 31 at the edge side. The flexible means 33 extends each time over the whole width of the insert 3 and is of such a length and flexibility so as to be able to span the insertion slot of the associated pipe receiving means 31 with a corresponding bend. The free length of the flexible means 33 substantially corresponds to the diameter of the holding section of the pipe receiving means 31.

Elastic and flexible abutment ribs 34 project from the underside of the insert 3. The abutment ribs 34 are made integral with the insert 3 and are fabricated from the same material as the insert 3. They form the abutment projections 34 within the meaning of the invention. The abutment ribs 34 extend over the whole width of the insert 3 in the axial direction of a pipe received in the pipe receiving means 31 as intended (see FIG. 4), i.e. they extend substantially in parallel with and substantially equally spaced apart from one another. The abutment projections 34 project over a length of about half the diameter of a holding section beyond the underside of the insert 3.

Figure 2:
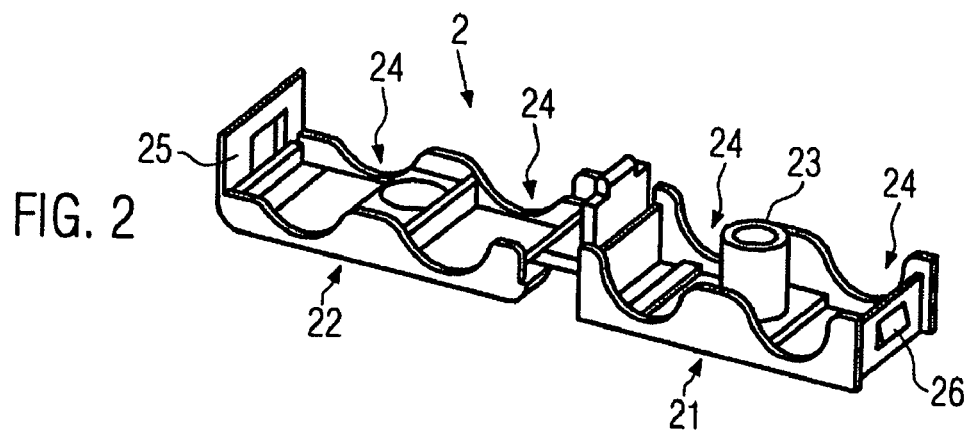
FIG. 2 is a perspective view of the housing of the holding device according to the invention in the closed state of the lid.

FIG. 2 shows the housing 2 of the holding device 1 of the invention. The housing 2 comprises a basic body 21 and a lid 22 hingedly connected via a hinge to the basic body 21. The basic body 21 and the lid 22 are each provided on the edges with four essentially semicircular recesses 24, of which two are respectively opposed in axial direction. In the closed state of the lid 22 the semicircular recesses 24 are put together to form circular recesses. Pipes 4 are introduced through the recesses 24 into the housing and are again led out of the housing, as shown in FIG. 4.

Figure 3:
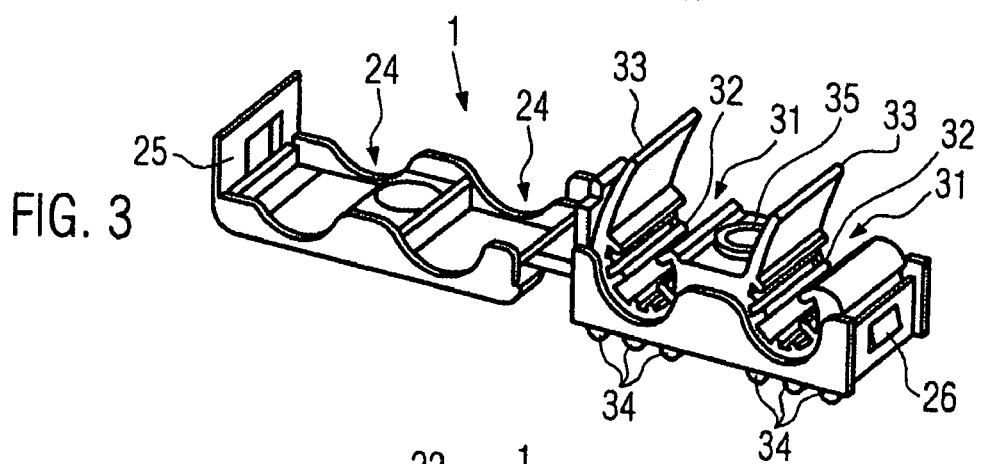
FIG. 3 shows the holding device according to the invention in the opened state of the lid, with the insert being inserted into the housing.
Figure 4:
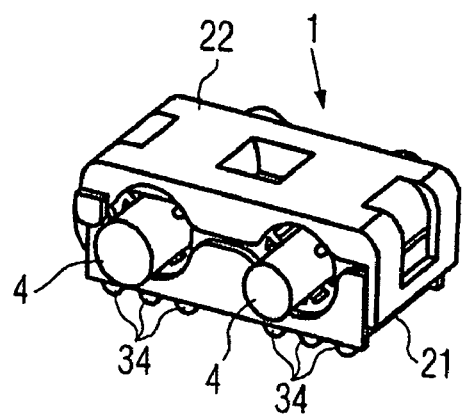
FIG. 4 shows the holding device according to the invention in the closed state of the lid and with pipes received in the pipe receiving means.

A housing bottom of the basic body 21 is provided with slotted openings through which the rib-like abutment projections 34 of the inserted insert 3, as shown in FIGS. 3 and 4, project out of the housing 2. To position the insert 3 in the basic body 21, a cylindrical pin 23 with a central through hole is provided, the outer diameter of said pin matching the inner diameter of the bore of the insert 3. The cylindrical pin 23 projects perpendicularly from the bottom of the basic body 21. The height of the cylindrical pin 23 is chosen such that the upper edge of the pin 23 in the inserted state of insert 3 is substantially positioned at the same level as the upper side of the insert 3 in the area of the fastening section 35. The pin 23 is preferably made integral with the housing 2, the housing 2 being preferably made from plastics.

The lid 22 is also provided with a central through hole. The positions of the through holes of the basic body 21, of the lid 22 and of the insert 3 are matched to one another such that in the closed state of the lid 22 the centers of the through holes are arranged positioned along an axis and a bolt is insertable into the through holes.

To fix the lid 22 in the closed state onto the basic body 21, a locking device is provided. A locking section 26 is provided on the basic body 21, the locking section having a projection which can be brought into engagement with a locking section 25 having an eyelet provided on the lid 22. The locking section 26 with the projection is made resilient and will first bounce back upon contact with the locking section 25. When projection and eyelet are superposed, the locking section 26 will snap in, thereby preventing a drifting apart of the basic body 21 and the lid 22. The engagement of the basic body 21 and the lid 22 can be undone in that a compressive force is exerted on the locking section 26 against the action of the resilient force and the projection is removed from the eyelet.

FIG. 3 shows the holding device 1 of the invention, the insert 3 being inserted into the basic body 21 of the housing 2. The insert 3 is arranged in the basic body 21 of the housing 2 such that the flexible means 33 are each arranged on the edge of each pipe receiving means 31 oriented towards the hinge. In the condition in which the lid 22 is opened, each flexible means 33 is spread apart from the insert 3 such that the insertion slot of each pipe receiving means 31 is exposed over about the whole cross-section of the semicircular holding section of each pipe receiving means 31 and a pipe 4 is insertable. In the inserted state of the insert 3 the abutment projections 3 project, as shown in FIG. 3, at the abutment side of the housing 2 out of the housing 2.

FIG. 4 shows the holding device 1 according to the invention in the closed state of the lid 22 which is locked with respect to the basic body 21 of the housing 2. The locking section 26 with projection is in engagement with the locking section 25 with eyelet, so that the lid 22 cannot be moved relative to the basic body 21. The pipes 4 are fixed secured in position in the respective pipe receiving means 31, the flexible means 33 of each pipe receiving means 31 being bent such that it fully spans the insertion slot of the pipe receiving means 31 and the pipe 4 is surrounded over its whole circumference by the flexible material of the insert 3. To safely fix the pipe 4 in the pipe receiving means 31, it is already enough when the flexible means 33 closes the insertion slot in the closed state of the lid 22 also at least in sections.

The use of the holding device 1 according to the invention shall now be described with reference to the enclosed drawings.

When the holding device 1 of the invention is mounted, the insert 3 is inserted into the basic body 21 of the housing 2 and is aligned in this process on the basis of the cylindrical pin 23, the outer diameter of which is adapted to the inner diameter of the bore of the fastening section 35 of the insert 3. In the inserted state of the insert 3, the rib-like abutment projections 34 pass through the housing bottom of the basic body 21 and project at the abutment side of the housing 2 out of the housing 2. A slot inside the housing wall can here be large enough to accommodate one, two or even three rib-shaped abutment projections 34 at the same time.

A state in which the insert 3 is inserted into the basic body 21 of the housing 2 is shown in FIG. 3. In this state the holding device 1 may already be mounted on a support device (not shown), with a bolt being inserted into the through hole of the cylindrical projection 23 and secured to the support device. Subsequently, the pipes 4 to be held are inserted through the insertion slots into the substantially semicircular holding sections of the pipe receiving means 31 and the housing lid 22 is closed. In this process the housing lid 22 is pivoted via the hinge relative to the basic body 21 until the projection of the locking section 26 engages into the eyelet of the locking section 25 and the lid 22 is locked relative to the basic body 21.

A state in which the pipes 4 are received in the housing and the lid 22 is locked relative to the basic body 21 is shown in FIG. 4.

Unless the holding device 1 has already been mounted on a support device, the holding device 1 can also be mounted only after insertion of the pipes on the support device and after closing of the lid 22. A bolt is here inserted into the through holes of the basic body 21, the lid 22 and the insert 3 and is secured to the support device (not shown). If desired, the lid 22 can also be fixed relative to the support device at the same time. To this end a head of a bolt, which is to be inserted at the lid side into the through holes of the basic body 21, the lid 22 and the insert 3, has a larger diameter than at least the through hole of the lid 22. The lid 22 cannot be opened if the holding device 1 is mounted accordingly. This prevents an unintended opening of the lid 22 after assembly.

The holding device 1 according to the invention can be used in a particularly advantageous manner in the automobile sector where pipes in which pressurized liquids are passed through must be secured to the car body and decoupled acoustically.

The invention claimed is:

1. A holding device for holding at least one pipe on a support structure, comprising:
   a housing having a basic body, a lid movable relative to the basic body and openings;
   an insert for insertion into the housing, said insert comprising a plurality of rib-like abutment projections which project through the housing openings at an abutment side of the housing to abut the support structure, at least one substantially U-shaped pipe receiving means configured to receive the pipe through an insertion slot in a radial direction, wherein the insert surrounds the pipe at least in sections, and wherein the insert comprises a flexible means configured to close the insertion slot in a closed state of the lid at least in sections;
   wherein the basic body, the lid and the insert each comprise:
   a through hole for receiving a bolt, centers of the through holes being substantially located along an axis in the closed state of the lid.

2. The holding device according to claim 1, wherein the insert comprises:
   at least one flexible holding projection projecting into the pipe receiving means.

3. The holding device according to claim 2, wherein the holding projection is made integral with the insert.

4. The holding device according to claim 2, wherein the holding projection is configured as a holding rib.

5. The holding device according to claim 4, wherein the basic body and the lid are hingedly connected to and pivotable relative each other.

6. The holding device according to claim 1, wherein the abutment projection is flexible.

7. The holding device according to claim 6, wherein the abutment projection is made integral with the insert.

8. The holding device according to claim 1 wherein the housing comprises:
   a locking section with a projection which is engageable with a locking section eyelet so as to lock the housing in the closed state of the lid.

9. The holding device according to claim 1, wherein the flexible means is made integral with the insert.

10. The holding device according to claim 1, wherein the basic body and the lid are hingedly connected to and pivotable relative each other.

11. The holding device according to claim 10 wherein the housing comprises:
   a locking section with a projection which is engageable with a locking section eyelet so as to lock the housing in the closed state of the lid.

* * * * *